United States Patent Office 3,312,753
Patented Apr. 4, 1967

3,312,753
PREPARATION OF BLOCK COPOLYMERS OF A CAPROLACTONE AND OXIRANE COMPOUND
Frederick E. Bailey, Jr., Charleston, and Haywood G. France, South Charleston, W. Va., assignors to Union Carbide Corporation, a corporation of New York
No Drawing. Filed Jan. 13, 1964, Ser. No. 337,145
10 Claims. (Cl. 260—823)

This invention relates to the process for preparing block copolymers. In one aspect this invention relates to the products resulting from the above-said process.

In the past few years increasing attention has been observed in the field of synthesizing block copolymers. This noted activity has been stimulated, in part, by their potential economic value. Block copolymers are copolymers which contain longer stretches of two or more monomeric units linked together by chemical valences in a single chain, for example:

–X–X–X–X–X–X–Y–Y–Y–Y–Y–Y–Y– thus, block copolymers represent in their structure and in their properties a transition between normal copolymers, i.e., random copolymers, and polyblends, i.e., a mixture of homopolymers.

The present invention is directed to a novel process for preparing block copolymers of a caprolactone and an oxirane compound, and to various novel block copolymers resulting therefrom. The aforesaid process is effected by contacting an oxirane compound with an organometallic catalyst, under an inert atmosphere, and for a period of time until substantial homopolymerization of the oxirane compound occurs. Subsequently, to the resulting product mixture maintained under an inert atmosphere there is charged an epsilon-caprolactone compound and the polymerization reaction is preferably continued until the aforesaid caprolactone has been substantially homopolymerized as a polymer block or polymer section of the resulting block copolymer. Thus, the resulting block copolymer comprises predominantly a block or section of homopolymerized oxirane compound chemically united in essentially linear fashion to a block or section of a homopolymerized caprolactone. After these sequence of steps, if desired, the same monomeric oxirane compound or a different monomeric oxirane compound can be again charged to the resulting reaction product mixture (still maintained under an inert atmosphere) and the polymerization deaction continued until this latter oxirane compound has been substantially homopolymerized as another polymer block or polymer section of the resulting block copolymer. If desired, a mixture of oxirane compounds may be employed in the initial polymerization stage, followed by a mixture of epsilon-caprolactones in the second stage, and so on.

The oxirane compounds which are contemplated are those which contain a sole cyclic group composed of two carbon atoms and one oxygen atom, i.e., vicinal epoxy group

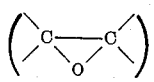

and which are free from ethylenic and acetylenic unsaturation. The oxirane compounds composed of carbon, hydrogen, and a sole oxirane oxygen atom are preferred. Illustrative oxirane compounds include, for example, ethylene oxide, 1,2-propylene oxide, 1,2-epoxybutane, 2,3-epoxybutane, isobutylene oxide, styrene oxide, epichlorohydrin, and the like.

The epsilon-captrolactones which are employed as starting materials in the novel process can be characterized by the following formula:

I

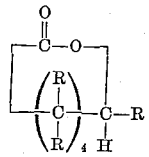

wherein each R, individually, is of the group consisting of hydrogen, alkyl which preferably contains from 1 to 4 carbon atoms, alkoxy which preferably contains from 1 to 4 carbon atoms, and halo which preferably is chloro; with the proviso that no more than 3 R substituents are groups other than hydrogen. Illustrative epsilon-caprolactones include the monoalkyl-, dialkyl-, and trialkyl-epsilon-caprolactones such as the monomethyl-, dimethyl-, trimethyl-, monoethyl-, diethyl-, triethyl-, monopropyl-, dipropyl-, tripropyl-, monoisopropyl-, and mono-n-butyl-caprolactones; the monoalkoxy-, dialkoxy-, and trialkoxy-epsilon-caprolactones such as the monomethoxy-, dimethoxy-, trimethoxy-, monoethoxy-, diethoxy-, triethoxy, mono-n-propoxy-, and monoisobutyl-epsilon-caprolactone; chloro-epsilon-caprolactone; and the like.

The organometallic catalysts which are contemplated in the polymerization reaction can be represented by the following formula:

II  $\qquad R'—M—R''_x$ where M is a Group II or III metal of the Periodic Table,[1] for example, magnesium, zinc, calcium, barium, cadmium, aluminum, strontium, and the like; wherein $x$ is an integer having a value greater than zero and less than 3 depending upon the valence of the metal M; wherein R' is a monovalent hydrocarbon radical free of ethylenic and acetylenic unsaturation, e.g., alkyl, aryl, cycloalkyl, aralkyl, alkaryl, and the like; and wherein each R'', individually, is hydrogen; a halo radical, e.g., chloro, fluoro, bromo, or iodo; a hydrocarbyloxy radical, e.g., alkoxy, aryloxy, and the like; or a monovalent hydrocarbon radical free of ethylenic and acetylenic unsaturation, e.g. alkyl, aryl, cycloalkyl, aralkyl, alkaryl, and the like. Illustrative monovalent hydrocarbon radicals include, for example, methyl, ethyl, propyl, isobutyl, sec-butyl, t-butyl, hexyl, 2-ethylhexyl, the decyls, the octadecyls, cyclopentyl, cyclohexyl, 2-methylcycloheptyl, phenyl, benzyl, ortho-, meta-, and para-tolyl, the xylyls, butylphenyl, phenethyl, phenylpropyl, and the like. Exemplary hydrocarbyloxy radicals include, for instance, methoxy, ethoxy, propoxy, isopropoxy, sec-butoxy, n-butoxy, t-butoxy, hexoxy, 2-ethylhexoxy, octadecoxy, phenoxy, phenethoxy, benzyloxy, phenylpropoxy, and the like. It is preferred that the R' and R'' variables contain less than 12 carbon atoms.

Illustrative subclasses of organometallic catalysts encompassed within the scope of Formula II supra include, for example, dialkylzinc, trialkylaluminum, alkylaluminum dihalide, dialkylcadmium, alkylzinc alkoxide, and the like. Specific illustrations include dimethylcadmium, di-n-butylzinc, triisobutylaluminum, n-butylzinc butoxide, and the like.

The catalysts are employed in catalytically significant quantities. For optimum results, the particular catalyst employed, the nature of the monomeric reactants, the operative conditions under which the polymerization reaction is conducted, and other factors, will largely determine the desirable catalyst concentration. In general, a catalyst concentration in the range of from about 0.001,

---

[1] The Periodic Table referred to in this specification including the appended claims is the "Periodic Chart of the Atoms" contained in the text entitled "Key to Periodic Chart of the Atoms," by W. F. Meggers, 1956 Edition, published by W. M. Welch Scientific Company, Chicago, Ill.

and lower, to about 5, and higher, weight percent, based on the weight of total monomeric feed, is suitable. A catalyst concentration in the range of from about 0.01 to about 2.0 weight percent is generally preferred.

The polymerization reaction can be conducted over a wide temperature range. Depending upon various factors such as the nature of the monomeric reactants employed, the particular catalyst employed, the concentration of the catalyst, and the like, the reaction temperature can be in the range of from about 20° C., to about 250° C., and higher. A suitable temperature range is from about 50° C. to about 200° C.

In general, the reaction time will vary depending upon the operative temperature, the nature of the monomeric reactant(s) employed, the particular catalyst and concentration employed, the use of an inert normally liquid organic vehicle, and other factors. The reaction time can vary from a few hours to several days depending upon the variables illustrated immediately above. A feasible reaction period is from about 5 hours to about a few days, and longer.

The polymerization reaction is effected under an inert atmosphere, e.g., nitrogen, helium, and the like.

The novel process of this invention can be conducted via the bulk polymerization, suspension polymerization, or the solution polymerization routes. The polymerization reaction can be carried out in the presence of an inert normally-liquid organic vehicle, such as, for example, aromatic hydrocarbons, e.g., benzene, toluene, xylene, ethylbenzene, and the like; various oxygenated organic compounds such as anisole, the dimethyl- and diethyl ethers of ethylene glycol, of propylene glycol, of diethylene glycol, and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like. If desired, a mixture of mutually miscible inert normally-liquid organic vehicles can be employed.

The process of the invention can be executed in a batch, semi-continuous, or continuous fashion. The reaction vessel can be a glass vessel, steel autoclave, elongated metallic tube, or other equipment and material employed in the polymer art. The reaction zone (be it, for example, a closed vessel or an elongated tube) can be fitted with an external heat exchanger to thus control undue temperature fluctuations, or to prevent any possible "runaway" reaction temperature due to the exothermic nature of the reaction. In a continuous operation employing as the reaction zone an elongated tube or conduit, the use of one or a plurality of separate heat exchangers can be conveniently used. In a batch operation, stirring means can be provided for agitating the reaction mixture, as desired.

The proportion of the reactants can vary over a wide range. Thus, the concentration of the reactants can be from about 5, and lower, to about 95, and higher, mol percent, based on the total mols of the reactants.

Unreacted monomeric reactants oftentimes can be recovered from the reaction product mixture by conventional techniques such as by heating said reaction product mixture under reduced pressure. Removal of unreacted monomeric reactants and/or inert organic vehicle can be accomplished by mechanical means such as treatment of the reaction product in a Marshall mill and the like.

The instant invention is admirably suitable for preparing novel block copoplymers which properties and characteristics can be "tailor-made" to fit various fields of application. For example, resinous poly(ethylene oxide) is water-soluble; however, by introducing a polymer block or polymer section of poly(epsilon-caprolactone) to the poly(ethylene oxide) molecule in accordance with the teachings hereinbefore described, the physical character of resinous poly(ethylene oxide) can be converted from hydrophilic to hydrophobic depending on the weight percent of poly(epsilon-caprolactone) added as a polymer block. Other properties such as the degree of stiffness, flexibility, tensile strength, hardness, etc. which may be desired in the novel block copoplymers for a particular field of application can be obtained by controlling the degree of polymerization of the oxirane compound and epsilon-caprolactone which are to form the polymer block or polymer section of the resulting block copolymers. In brief, novel block copolymers covering a wide spectrum of properties and characteristics are obtainable by the practice of the instant invention. The novel resinous block copolymers are useful in the preparation of shaped articles by employing molding and extruding techniques. The block copolymers are also useful in the preparation of films by conventional techniques such as milling on a two roll mill, calendering, solvent casting, and the like. Water-soluble films can be used for unit packaging of a wide variety of water-soluble chemicals such as household detergents. Water-insoluble films, on the other hand, are useful in protecting various apparatus such as machinery from exposure to moisture and dampness. The water-soluble block copolymers also have utility as thickeners.

The novel solid block copolymers which result from the novel process are characterized by a polymer block or section which contains a series of interconnected alkyleneoxy units having the formula:

III 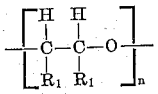

wherein each $R_1$, individually, is hydrogen, haloalkyl, or a monovalent hydrocarbon radical which is free from ethylenic and acetylenic unsaturation, such as alkyl, aryl, aralkyl, alkaryl, cycloalkyl, and the like, for example, methyl, ethyl, n-propyl, isopropyl, isobutyl, n-butyl t-butyl, sec-butyl, phenyl, benzyl, chloromethyl, and the like. It is preferred that the $R_1$ variables be hydrogen, methyl, chloromethyl, and the like. The oxy group (—O—) of one alkyleneoxy unit is connected to an alkylene group of an adjacent alkyleneoxy unit in the series.

In addition, the novel block copolymers are characterized by a polymer block or section which contains a series of interconnected carbonylalkyleneoxy units having the formula:

IV 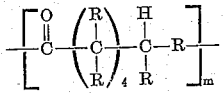

wherein each R, individually, has the values (and proviso) assigned in Formula I supra, and preferably the R variables are hydrogen or methyl. The carbonyl group $$(-\overset{O}{\underset{\|}{C}}-)$$

of one carbonylalkyleneoxy unit is connected to an oxy group of an adjacent carbonylalkyleneoxy unit in the series. Moreover, the terminal oxy group at one end of the series of interconnected alkyleneoxy units (III) is bonded to the terminal carbonyl group which is at one end of the series of interconnected carbonylalkyleneoxy units (IV). The variables $n$ and $m$ are numbers, the ratio of $n/m$ being a value in the range of from about 0.05 to about 25. The average molecular weight of the novel block copolymers is at least about 20,000 and upwards to about several hundred thousand, e.g., about 500,000, and higher, and preferably upwards from about 30,000.

Since the novel block copoplymers are relatively high molecular weight products, the end groups are insignificant. However, the end groups will depend upon the catalyst of choice, the purification techniques of the reaction product mixture, and other factors. Infra-red analysis fails to disclose the terminal moieties of the relatively high molecular weight polymeric molecules. The end groups, in general, are monovalent organic moieties such as hydrocarbyl, hydrocarbyloxy, acyl, etc., e.g., alkyl, alkoxy, aryloxy, alkanoyl, cycloalkyl, and the like. The polymer chain can also be terminated by the metal containing catalyst residue which oftentimes can be removed by conventional purification techniques, exposure to the atmosphere, and other procdures well known in the polymer art. These techniques can result in the formation of hydroxy end group.

Particularly desirable block copolymers, both from a standpoint of economics and performance characteristics, are those in which unit IV supra is characterized as follows:

V

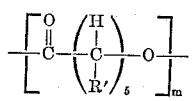

wherein R' is hydrogen and methyl, no more than one R' being a substituent other than hydrogen; and in which unit III is characterized as follows:

VI

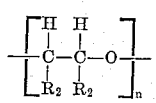

wherein each $R_2$ is hydrogen or methyl.

A suitable procedure for conducting the novel process of the invention as illustrated in the examples supra is as follows: To a stainless steel autoclave, after flushing with an inert gas such as nitrogen, argon, or the oxirane compound, if volatile, there is charged said oxirane compound, catalyst, and inert organic vehicle, e.g., toluene, if desired. The reaction mixture is then heated to the desired temperature, for instance, about 100° C., and preferably maintained thereat until the polymerization is substantially complete, e.g., until at least about 75 percent and preferably at least about 90 percent of the oxirane compound is polymerized. This degree of polymerization is readily determined by the operator who can intermittently remove a sample of the reaction mixture and analyze same for unreacted oxirane compound. When substantial polymerization occurs, the autoclave is preferably cooled to about 25° C., and while the reaction product mixture is still maintained under an inert atmosphere an epsilon-caprolactone is then charged to the sealed autoclave. The resulting reaction mixture is again heated to the desired operative temperature and preferably maintained thereat until said caprolactone is substantially polymerized as a polymer block or polymer section of the resulting block copolymer product. These block copolymers can range from viscous liquid to high molecular solid products. The viscous liquids to the relatively low molecular solid products are useful in the preparation of cosmetics, polishes, and waxes, and as thickening agents for lubricants. They are also useful as oil additives.

The reduced viscosity values referred to herein are measured at a concentration of 0.2 gram of block copolymer in 100 milliliters of an inert organic solvent, e.g., acetonitrile, benzene, etc. As is well known, the reduced viscosity value is an indication of the average molecular weight of the candidate block coplymer. The greater the reduced viscosity value (under comparative conditions) the greater the average molecular weight.

*Example 1*

To a two-liter, stainless steel autoclave there are charged 90 grams of propylene oxide, 298 grams of toluene, and 3.5 grams of dibutylzinc. The resulting mixture is then heated to 108° C. and maintained thereat for 65 hours after which period of time substantially homopolymerization of propylene oxide occurs. The autoclave is subsequently cooled to room temperature, i.e., about 20° C. to 25° C., and 45 grams of epsilon-caprolactone are charged to said autoclave. The temperature of the resulting mixture was again raised to 108° C. and maintained thereat for 79 hours after which period of time substantial homopolymerization of epsilon-caprolactone occurs as as polymer block of the resulting block copolymer product. Addition of heptane to the reaction mixture, with agitation, results in the precipitation of the block copolymer product. This product is recovered by filtration and dried under reduced pressure at about 40° C. There is obtained 100 grams of a white, solid, water-insoluble block copolymer which has a reduced viscosity in benzene of 0.3.

*Example 2*

To the equipment described in Example 1 there are charged 320 grams of ethylene oxide, 289 grams of toluene, and 1.84 grams of dibutylzinc. The resulting mixture is then heated to 100° C. and maintained thereat for 19 hours after which period of time substantial homopolymerization of ethylene oxide occurs. The autoclave is subsequently cooled to room temperature, i.e., about 20° C. to 25° C., and 80 grams of mixed methyl-epsilon-caprolactones [2] are charged to said autoclave. The temperature of the resulting mixture is again raised to 100° C. and maintained thereat for 23 hours after which period of time substantial homopolymerization of the mixed methyl-epsilon-caprolactones occurs as a polymer block of the block copolymer product. Addition of heptane to the reaction mixture, with agitation, results in the precipitation of the block copolymer product. This product is recovered by filtration and dried under reduced pressure at about 40° C. There is obtained, a white, solid, water-soluble, acetonitrile-soluble, block copolymer.

*Example 3*

In a manner similar to Example 2, when 320 grams of butylene oxides [3] are employed in lieu of ethylene oxide, there is obtained a white, solid, water-insoluble, benzene-soluble, block copolymer.

What is claimed is:

1. A solid block copolymer characterized by a polymer block when contains a series of interconnected alkyleneoxy units of the formula:

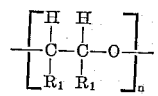

wherein each $R_1$, individually, is of the group consisting of hydrogen, haloalkyl, and a monovalent hydrocarbon radical free from ethylenic and acetylenic unsaturation; wherein the oxy group of one alkyleneoxy unit is connected to an alkylene group of an adjacent alkyleneoxy unit in the series; and a polymer block which contains a series of interconnected carbonylalkyleneoxy units of the formula:

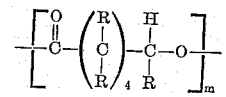

wherein each R, individually, is of the group consisting of hydrogen, alkyl, halo, and alkoxy, with the proviso that no more that 3 R substituents are groups other than hydrogen; wherein the carbonyl group of one carbonylalkyleneoxy unit is connected to an oxy group of an adjacent carbonylalkyleneoxy unit in the series; wherein $n$ and $m$ are numbers, the ratio of $n/m$ being a value of from about 0.05 to about 25; wherein the average molecular weight is at least about 20,000; and wherein the terminal oxy group at one end of the series of interconnected alkyleneoxy units is bonded to the terminal carbonyl group which is at one end of the series of interconnected carbonylalkyleneoxy units.

---

[2] An isomeric mixture containing, by weight, about 30 percent gamma-methyl-, about 30 percent epsilon-methyl-, about 40 percent beta-methyl- and delta-methyl-epsilon-caprolactones.

[3] An isomeric mixture of about 70 weight percent 1,2-epoxybutane and about 30 weight percent of cis and trans 2,3-epoxybutanes.

2. A block copolymer as defined in claim 1 wherein said alkyleneoxy is ethyleneoxy and wherein said carbonylalkyleneoxy is carbonylpentamethyleneoxy.

3. A block copolymer as defined in claim 1 wherein said alkyleneoxy is propyleneoxy and wherein said carbonylalkyleneoxy is carbonylpentamethyleneoxy.

4. A block copolymer as defined in claim 1 wherein said alkyleneoxy is butyleneoxy and wherein said carbonylalkyleneoxy is carbonylpentamethyleneoxy.

5. A process for preparing block copolymers which comprises contacting an oxirane compound containing a sole cyclic group of the structure:

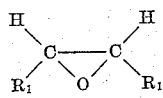

wherein each $R_1$, individually, is of the group consisting of hydrogen, haloalkyl, and a monovalent hydrocarbon radical free from ethylenic and acetylenic unsaturation with a catalytic quantity of an organometallic compound of the formula:

$$R'-M-R''_x$$

wherein M is selected from the group consisting of metals of Group II and Group III of the Periodic Table; wherein $x$ is an integer having a value greater than zero and less 3 depending upon the valence of the metal M; wherein R' is a monovalent hydrocarbon radical free of ethylenic and acetylenic unsaturation; and wherein each R'', individually, is of the group consisting of hydrogen, halo, hydrocarbyloxy, and a monovalent hydrocarbon radical free of ethylenic and acetylenic unsaturation; under an inert atmosphere; for a period of time sufficient to effect polymerization of said oxirane compound; subsequently introducing an epsilon-caprolactone to the reaction product mixture maintained under an inert atmosphere, said epsilon-caprolactone having the formula

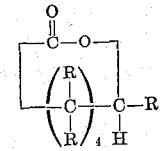

wherein each R, individually, is of the group consisting of hydrogen, alkyl, alkoxy, and halo, with the proviso that no more than three R substituents are groups other than hydrogen; for a period of time sufficient to effect substantial polymerization of said epsilon-caprolactone as a polymer block linearly attached to said polymerized oxirane compound, and recovering the resulting block copolymer product.

6. The process of claim 5 wherein the polymerization reaction temperature is in the range of from about 20° C. to about 250° C.

7. The process of claim 6 wherein said organometallic compound is dialkylzinc.

8. The process of claim 7 wherein said dialkylzinc is di-n-butylzinc, wherein said oxirane compound is ethylene oxide, and wherein said caprolactone is epsilon-caprolactone.

9. The process of claim 7 wherein said dialkylzinc is di-n-butylzinc, wherein said oxirane compound is propylene oxide, and wherein said caprolactone is epsilon-caprolactone.

10. The process of claim 7 wherein said dialkylzinc is di-n-butylzinc, wherein said oxirane compound is butylene oxide, and wherein said caprolactone is epsilon-caprolactone.

References Cited by the Examiner

UNITED STATES PATENTS 3,169,945 2/1965 Hostettler et al. ----- 260—78.3
3,219,725 11/1965 Kirkland et al. ------ 260—823

MURRY TILLMAN, Primary Examiner.

D. J. BREZNER, Assistant Examiner.